UNITED STATES PATENT OFFICE.

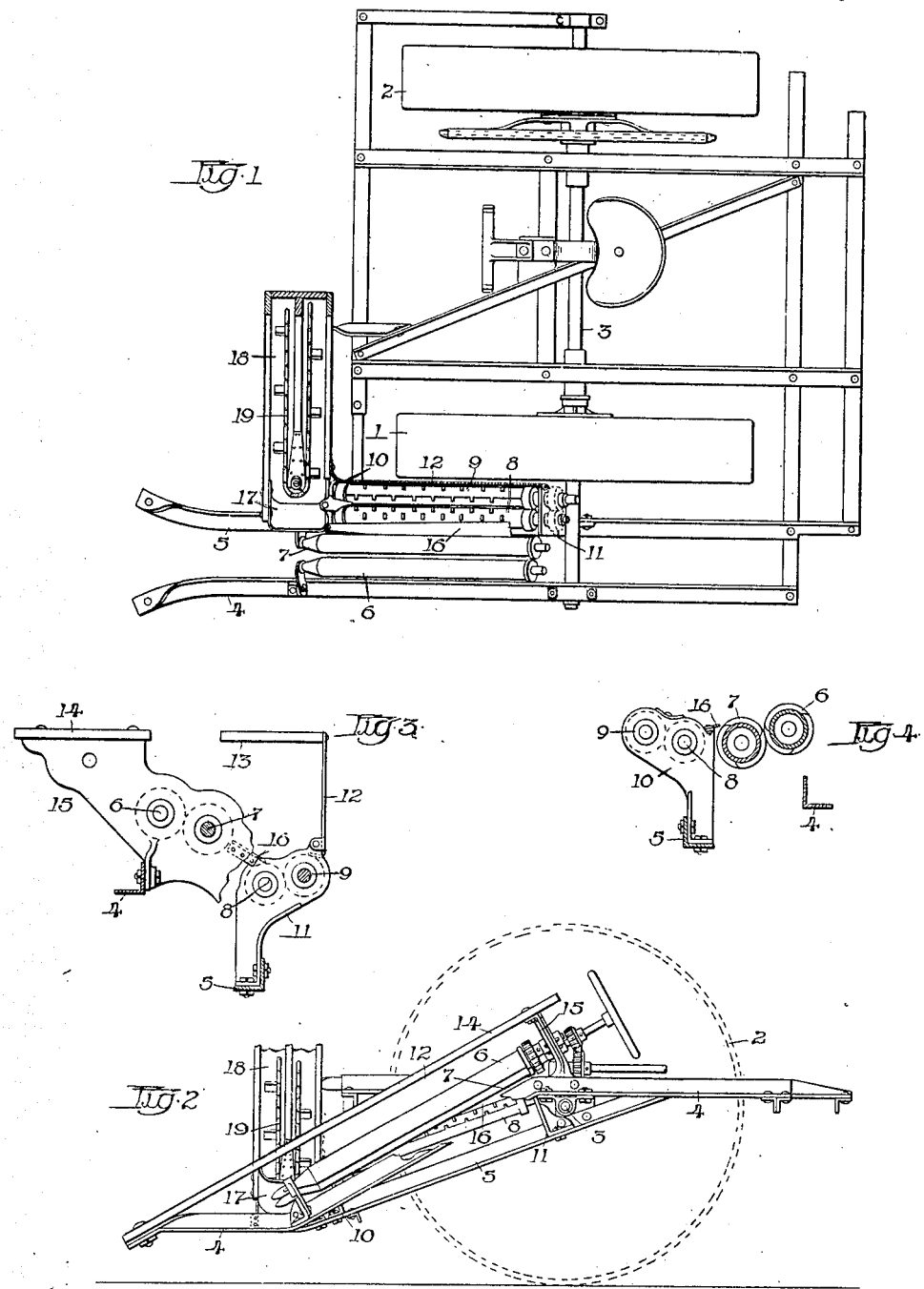

JOHN A. STONE, OF CHICAGO, ILLINOIS, ASSIGNOR TO INTERNATIONAL HARVESTER COMPANY, A CORPORATION OF NEW JERSEY.

CORN-HARVESTER.

No. 920,210.  Specification of Letters Patent.  Patented May 4, 1909.

Application filed January 14, 1909. Serial No. 472,156.

*To all whom it may concern:*

Be it known that I, JOHN A. STONE, a citizen of the United States, residing at Chicago, in the county of Cook and State of Illinois, have invented certain new and useful Improvements in Corn-Harvesters, of which the following is a specification.

My invention relates to that class of corn harvesters designed to receive the row of stalks between a pair of snapping rollers that are inclined upward from front to rear and adapted to sever the ears therefrom, and husking rollers adapted to strip the husks from the severed ears; its object being to provide a construction wherein the husking rollers are placed adjacent the snapping rollers for the purpose of receiving the ears of corn directly therefrom, and in an improved organization of the various parts whereby a more efficient operation of the same may be secured. These objects are attained by means of the mechanism illustrated in the accompanying drawing, in which—

Figure 1 is a plan view of a corn harvester wheel frame designed to illustrate the manner of mounting the snapping and husking rollers thereon; Fig. 2 is a partial side elevation of Fig. 1; Fig. 3 is a detached detail drawing showing the relative positions of the snapping and husking rollers at their rear ends; and Fig. 4 shows the relative position of the same parts at their forward ends.

The same reference characters designate the same parts throughout the various views.

Referring to the drawings, 1 represents the traction wheel upon the grainward side of the machine, 2 the traction wheel upon the stubbleward side thereof, and 3 the axle journaled in bearings secured to the wheel frame portion and having said traction wheels mounted thereon. The wheel frame includes two bars 4 and 5 mounted upon the grainward side of the main frame and spaced apart in a manner to form a passageway for the stalks, the bar 4 being located upon the grainward side of the passage way and the two bars being inclined upward from front to rear, the bar 5 being at a less angle relative to the ground line than the bar 4.

6 and 7 designate snapping rollers mounted at the grainward and stubbleward sides of the passageway, respectively, and inclined upward from front to rear, the roller 6 being arranged in a higher plane than that of the roller 7. Upon the stubbleward side of the passageway, in close proximity to the snapping rollers upon one side thereof and the traction wheel 1 upon the other, is mounted a pair of corn husking rollers 8 and 9, the stubbleward roller 9 being arranged in a higher plane than its coacting roller 8. The husking rollers are inclined upward from front to rear but at a less angle relative to the ground line than the snapping rollers, their forward ends being substantially in the same plane as the forward ends of the snapping rollers, as shown in Fig. 4, and their rear ends below the plane of said rollers, as shown in Fig. 3. The husking rollers are journaled at their forward ends in a bracket 10 secured to the lower end of the frame bar 5, and at their upper rear ends in a similar bracket 11 secured to the same bar, and 12 represents a vertically arranged shield having its opposite ends secured to said bracket and operative to retain the ears in contact with the rollers.

13 represents a guide board upon the stubbleward side of the corn passageway, having its lower forward end secured to the forward end of the bar 5 and the upper edge of the shield 12 is secured thereto. The guide board 13 coöperates with a similar board 14 upon the opposite side of the passageway in forming a laterally confined passageway for the stalks above the snapping rollers, the board being secured at its lower end to the bar 4 and its upper end secured to a bracket 15, in which the rear ends of the snapping rollers are journaled.

16 represents a deflector supported at opposite ends by the brackets in which the snapping rollers are journaled and operative to deflect the ears of corn from the snapping rollers to the husking rollers. The ears of corn are received from the lower ends of the husking rollers by a hopper 17 supported upon the frame bar 5, and 18 represents an elevator chute having its lower end connected with said hopper.

19 is an endless carrier operative in connection therewith to conduct the ears to other operative parts of the machine.

What I claim as my invention, and desire to secure by Letters Patent, is:

1. In a combined corn harvester and husker, the combination of a wheel frame, an axle journaled in bearings secured to said wheel frame, traction wheels mounted upon said axle and operative upon the stubbleward side of a row of corn, said wheel frame including bars at the grainward side thereof beyond the grainward traction wheel and spaced apart in a manner to form a passageway for the stalks between them and inclined upward from front to rear, the stubbleward bar being inclined at a less angle than the grainward bar, snapping rollers located upon opposite sides of said passageway and inclined upward from front to rear, a pair of corn husking rollers located in close proximity to the stubbleward side of said snapping rollers and the adjacent traction wheel, and having their forward ends in substantially the same horizontal plane as the forward ends of said snapping rollers, and their rear ends in a lower plane than the rear ends thereof.

2. In a combined corn harvester and husker, the combination of a wheel frame, an axle journaled in bearings secured to said wheel frame, traction wheels mounted upon said axle and operative upon the stubbleward side of a row of corn, said wheel frame including bars at the grainward side thereof spaced apart in order to form a stalk passageway between them and inclined upward from front to rear, the stubbleward bar being inclined at a less angle than the grainward bar, snapping rollers located upon opposite sides of said pasageway and inclined upward from front to rear, a pair of corn husking rollers located in close proximity to the stubbleward side of said snapping rollers and the adjacent traction wheel, and having their forward ends in substantially the same horizontal plane as the forward ends of said snapping rollers, and their rear ends in a lower plane than the rear ends thereof, a receiving hopper at the lower end of said husking rollers, an elevator chute connected with said hopper, and an endless conveyer mounted in said chute.

JOHN A. STONE.

Witnesses:
J. E. MERRION,
A. B. DACK.